United States Patent [19]

Johnson

[11] Patent Number: 4,579,071
[45] Date of Patent: Apr. 1, 1986

[54] PACKER WHEEL ASSEMBLY

[76] Inventor: Douglas J. Johnson, Box 5240, Sidney, Mont. 59270

[21] Appl. No.: 601,787

[22] Filed: Apr. 18, 1984

[51] Int. Cl.⁴ ............................................. A01C 7/20
[52] U.S. Cl. ................................................... 111/85
[58] Field of Search ............... 111/85, 86, 73, 54, 111/55, 59, 60, 61, 62, 66, 69, 70, 71, 80, 79, 81-84, 88; 172/519, 518, 551, 573, 538; 16/44

[56] References Cited

U.S. PATENT DOCUMENTS

| | | | |
|---|---|---|---|
| 309,403 | 12/1884 | Otstot | 111/85 |
| 1,091,831 | 3/1914 | Gibbons | 172/711 |
| 1,202,562 | 10/1916 | Mintern | 111/85 |
| 1,388,498 | 8/1921 | Welke | 172/156 |
| 1,653,760 | 12/1927 | Carey | 172/551 |
| 1,901,299 | 3/1933 | Johnson | 172/536 |
| 2,515,704 | 7/1950 | Gardiner | 16/44 |
| 2,712,780 | 7/1955 | Graham | 172/657 |
| 2,736,279 | 2/1956 | Johnston | 111/85 X |
| 3,100,462 | 8/1963 | Steele et al. | 111/77 |
| 3,175,622 | 3/1965 | Stam | 111/85 X |
| 4,009,668 | 3/1977 | Brass et al. | 111/85 |
| 4,296,695 | 10/1981 | Quanbeck | 111/73 X |
| 4,307,674 | 12/1981 | Jennings et al. | 111/85 |
| 4,466,492 | 8/1984 | Steinberg | 172/573 X |

FOREIGN PATENT DOCUMENTS

| | | | |
|---|---|---|---|
| 2001061 | 7/1971 | Fed. Rep. of Germany | 111/85 |
| 204757 | 1/1968 | U.S.S.R. | 111/85 |

Primary Examiner—Robert A. Hafer
Assistant Examiner—Danton DeMille
Attorney, Agent, or Firm—Burd, Bartz & Gutenkauf

[57] ABSTRACT

Packer wheel assemblies attached to earthworking tools of a field cultivator compact soil about seeds dispensed into the soil with an air planter. Each packer wheel assembly has a body adjustably mounted on the shank of each tool and an arm pivotally connected to the body. Ground engaging wheels are rotatably mounted on the arm. A coil spring connected to the arm biases the wheels downwardly into engagement with the soil.

18 Claims, 9 Drawing Figures

PACKER WHEEL ASSEMBLY

FIELD OF INVENTION

The invention is directed to the field of earth working implements and seed planters used to plant grain and grass seeds.

BACKGROUND OF INVENTION

Field cultivators and chisel plows are used to break and work agricultural soil in preparation for planting of grains, such as wheat and soybeans and grass seeds. Broad cast planters and grain drills are used to plant the seeds in the soil. This practice requires two operations wherein tractors and implements are moved over the soil to prepare the seed bed. The second operation is the planting of the seed with a planter or grain drill. Minimum tillage implements have been designed wherein the soil is worked and the seed is planted in one operation.

Air seed planters have been mounted on existing chisel plows to plant seeds behind the earth working tools on the chisel plows. It has been found that the use of air seeders in marginal conditions of soil moisture result in poor germination of the seeds. Soil packing schemes have been used to improve seed germination by sealing and packing the soil. This is accomplished with a transverse gang of wheels trailered behind the chisel plow. The gang of wheels is mounted on a common axle and does not follow the contour of the soil. All of the wheels are spaced a considerable distance behind the chisel plow so that they do not track the earth working tools on a hill side grade. The packer wheel assembly of the present invention overcomes the disadvantages of the gangs of wheels used to pack the soil behind a chisel plow equipped with an air seeder.

SUMMARY OF INVENTION

The invention is directed to a packer wheel assembly used with a conventional field cultivator equipped with an air seeder for compacting the soil about the seeds dispensed into the soil by the air seeder. The field cultivator has earth working tool assemblies that are located in normal earth working positions to work the soil. Each earth working tool assembly has a shank carrying a tool. A planter, such as an air seed planter, mounted on the cultivator is operable to dispense seed into the soil behind a selected number of shanks of the earth working tools. The seed is discharged immediately behind the shovels mounted on the lower ends of the shanks for direct placement into the soil. Soil packers operate to compress and compact the soil about the seeds. The packers are mounted directly on the shanks of the earth working tools. Each packer has a body adjustably clamped to a shank so that the packer can adjust the earth working depth of the tool and planting depth of the seeds. The packer has wheel means for engaging the soil in a close proximity rearwardly of the shank. The wheel means track the shank and do not drift or move sideways when on a hill side grade. Arm means pivotally connect the wheel means to the body and allow the wheel means to move in an up and down direction so that they can ride over and clear obstructions such as rocks and the like. The arm means engages a stop mounted on the body. The position of the stop relative to the body is adjustable so that the location of the arm means is adjustable and thereto provide for further adjustment of the earth working depth of the tool and the planting depth of the seed in the soil. Biasing means, such as a coil spring unit, biases the arm means in a downward direction in engagement with the stop and yieldably hold the wheel means in engagement of the soil thereby provide a compacting force that compresses the soil about the seeds. The biasing means comprises a double coil torsion spring that is located about the pivot member that connects the arm to the arm means and locates the arm means centrally of the pivot member. Outer ends of the torsion spring engage the stop to maintain the torsional force on the spring.

In one embodiment of the invention, the wheel means comprises a pair of wheels located adjacent opposite sides of the lower ends of the arm means. Each wheel has an outer peripherial surface that rolls over the soil compressing the soil downwardly to compact the soil about the seeds. In another embodiment, the wheel means comprises a single wheel located in general longitudinal alignment with the shank of the earth working tool. The single wheel is biased downwardly to compress the soil above the seed into firm engagement with the seed.

The packer wheel units are adapted to be installed on conventional cultivators and chisel plows with a minimum of time and labor. The packer wheel units are used with an air seed planter to provide a low cost seed planting implement capable of planting small grain and grass seeds in agricultural and semi-agricultural soils. The packer wheel units improve the germination of the seeds by providing for controlled depth of the planting of the seeds in the soil and compacting the soil about the seeds. The seed depth and compaction pressure of the wheels can be adjusted to accommodate different soils and soil moisture conditions.

DESCRIPTION OF PREFERRED EMBODIMENTS

Figure 1:
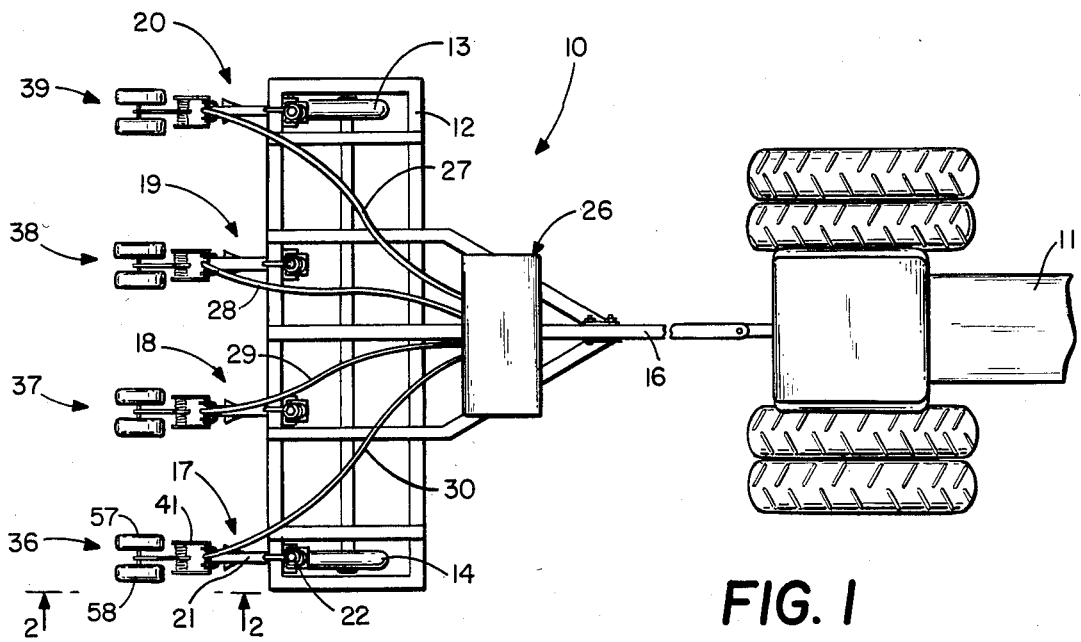
FIG. 1 is a plan view of a field cultivator equipped with an air seed planter and packer wheel assembly; of the invention.

Referring to FIG. 1, a chisel plow or field cultivator indicated generally at 10 is connected to a tractor 11. Cultivator 10 is a conventional earth working implement used to work agricultural soil. Examples of field cultivators are shown in U.S. Pat. Nos. 2,712,780 and 3,575,243. Cultivator 10 has a generally rectangular frame 12 supported above the ground by a pair of wheels 13 and 14. An elongated tongue 16 mounted on frame 12 connects cultivator 10 to the drawbar of tractor 11. A plurality of earth working tool assemblies 17, 18, 19 and 20 mounted on frame 12 work the soil when the cultivator is moved with tractor 11.

Each of earth working tool assemblies 17-20 has a C-shaped shank or standard 21. Shank 21 is a C-shaped leaf spring member. The upper end of shank 21 is yieldably attached to frame 12 with a spring unit 22. An earth working tool or shovel 23 is attached to lower end of shank 21. The shovel 23, shown in FIG. 2, works soil 24 during forward movement of the cultivator.

Returning to FIG. 1, an air seed planter indicated generally at 26 is mounted on frame 12. Planter is a conventional seed planting mechanism having a hopper for accommodating seed and blower means for providing air under pressure and move seed to the seed bed in the soil. A plurality of hoses 27, 28, 29 and 30 carry the seed from air seed planter 26 to earth working tool assemblies 17, 18, 19 and 20. Each of the earth working tool assemblies on the field cultivator can be provided with hoses for carrying air and seed to the earth working tool assemblies. Preferably the rear row of earth working tool assemblies are used to plant seeds in generally parallel longitudinal rows.

Figure 2:
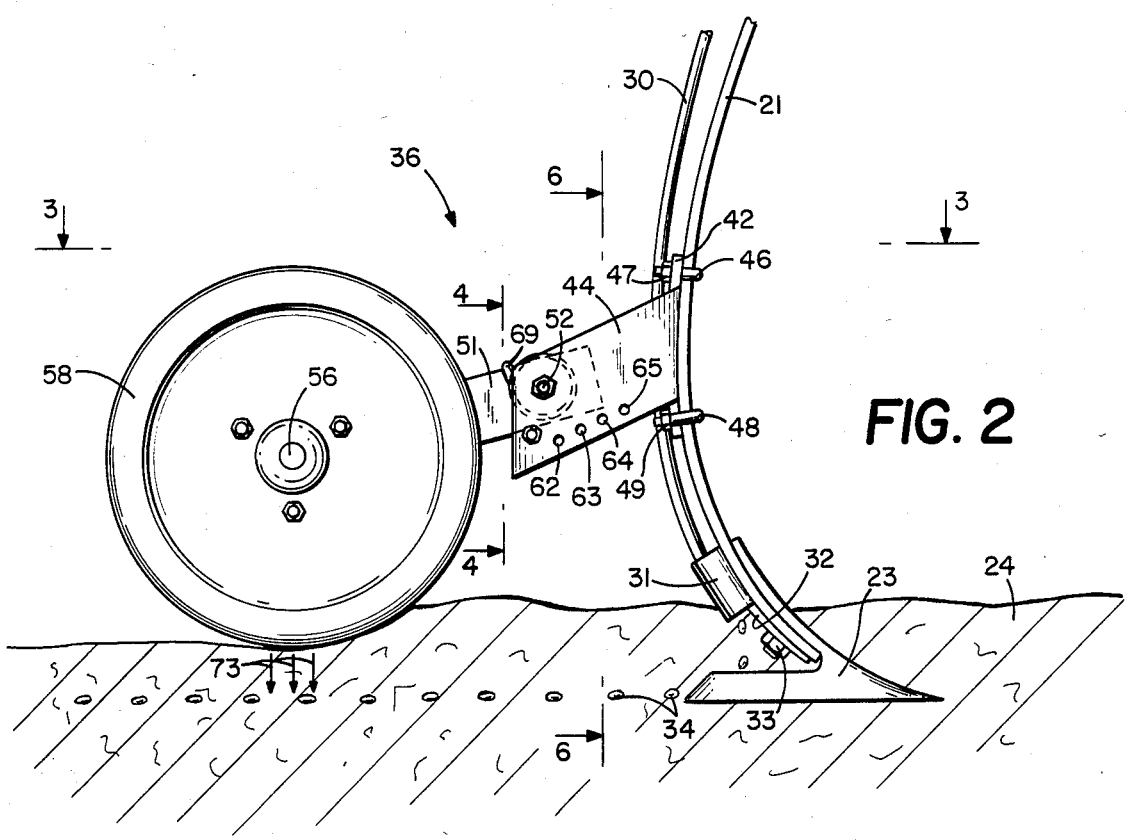
FIG. 2 is an enlarged side view taken along line 2—2 of FIG. 1.

As shown in FIG. 2, a sleeve 31 having a downwardly directed ear 32 is attached to shank 21 with a plow bolt 33. Bolt 33 also mounts shovel 23 to shank 21. Sleeve 31 directs seed 34 into the furrow in the soil 24 immediately behind shovel 23.

Packer wheel assemblies 36, 37, 38 and 39 are mounted on the shanks of the earth working tool assemblies 17, 18, 19 and 20 to firmly compress the soil around seeds 34. The packer wheel assemblies follow the contours of the soil and gauge the depth of each of the tools thereby control the planting depth of the seed. The packer wheel assemblies 36 to 39 are identical in structure. The following description is directed to packer wheel assembly 36.

Figure 3:
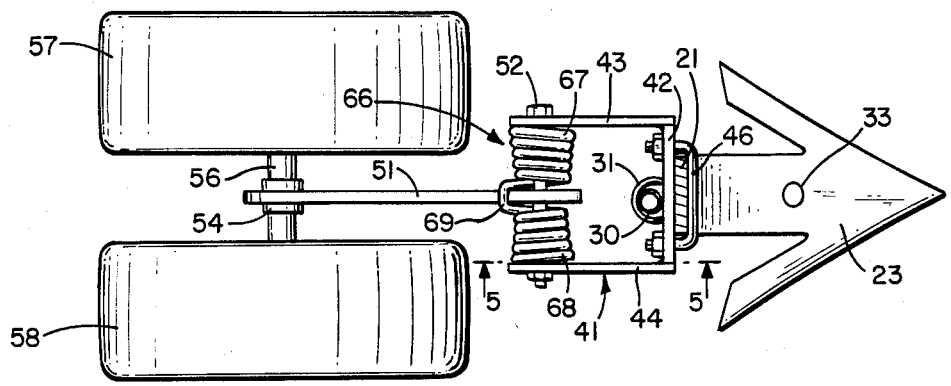
FIG. 3 is a sectional view taken along line 3—3 of FIG. 2.
Figure 4:
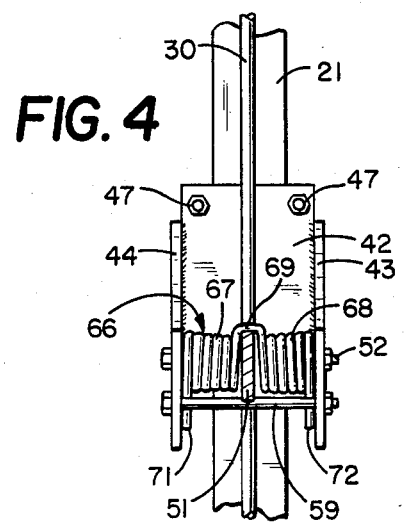
FIG. 4 is a sectional view taken along line 4—4 of FIG. 2.
Figure 6:
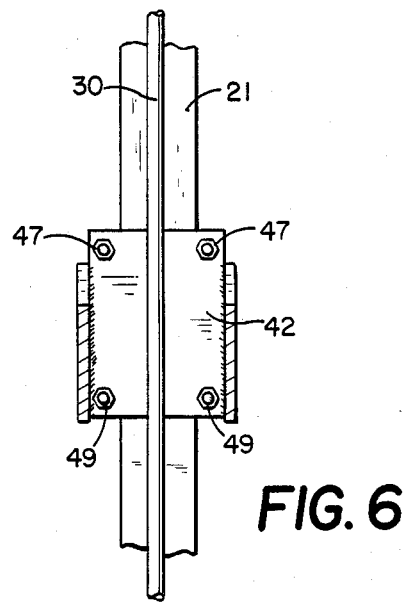
FIG. 6 is a sectional view taken along line 6—6 of FIG. 2.

As shown in FIGS. 2, 3 and 4, packer wheel assembly 36 has a body or U-shaped member 41 mounted on shank 21. Body 41 has a base 42 and rearwardly directed side members 43 and 44. Side members 43 and 44 are laterally spaced from each other and extend in a downward and rearward direction from shank 21. A pair of U-bolts 46 and 48 secure base 42 to shank 21. Nuts 47 are threaded onto the ends of U-bolt 46 that pass through suitable holes in base 42. In similar manner, nuts 49 are threaded onto the ends of U-bolt 48 that extend to suitable holes in base 42. Nuts 47 and 49 can be released to permit packer wheel assembly 36 to be adjustably located along the length of shank 21. This adjustment is used to vary the normal earth working depth of shovel 23 and depth of the seeds 34 in the soil.

A rearwardly directed strut or arm 51 is pivotally mounted with a bolt 52 to side members 43 and 44. Arm 51 has a hole 53, shown in FIG. 5, accommodating bolt 52. Side members 43 and 44 have aligned holes to accommodate the opposite ends of bolt 52. As shown in FIG. 3, the rear lower portion of arm 51 has a bearing 57 accommodating a transverse axle 56. A pair of wheels 57 and 58 are rotatably mounted on opposite ends of axle 56. Wheels 56 and 57 have cylindrical outer surfaces that move soil over the seeds 34 and compress the soil around the seeds. Wheels 57 and 58 can have other shapes to compress the soil about seeds 34.

Figure 5:
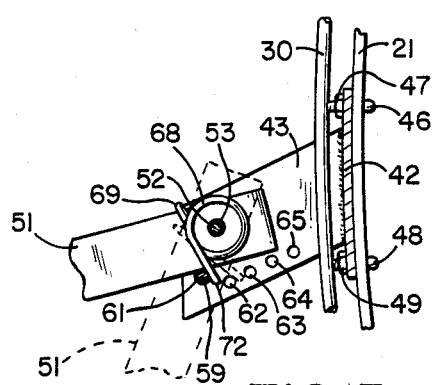
FIG. 5 is a sectional view taken along line 5—5 of FIG. 3.

As shown in FIGS. 4 and 5, a stop pin or bolt 59 is mounted on side members 43 and 44 below arm 51. Stop bolt 59 limits the downward movement of arm 51 and provides for adjustment of the earth working depth of shovel 23. Side members 43 and 44 have a plurality of spaced holes 61 to 65 for accommodating stop bolt 59. As shown in FIG. 5, when stop bolt 59 is located in hole 62, arm 51 is moved to the broken line position into engagement with stop bolt 59. This raises shank 21 and reduces the depth of the seeds 34 in the soil.

Arm 51 and wheels 57 and 58 are biased in a downward direction with a spring assembly indicated generally at 66. As shown in FIGS. 3, 4 and 5, spring assembly 66 comprises a double coil torsion spring having a first coil spring 67 and a second coil spring 68. A U-shaped central portion 69 connects the adjacent ends of coil springs 67 and 68. Portion 69 extends over and engages the top of arm 51. The inner end of arm 51 is pivotally mounted on bolt 52 between coil springs 67 and 68. The outer end of coil spring 67 extends downwardly and engages stop bolt 59 adjacent side member 44. The outer end 72 of coil spring 68 extends downwardly adjacent side member 43 and engages stop bolt 59. The stop bolt 59 maintains coil springs 67 and 68 under tension to apply a continuousing biasing or torsional force on arm 51 to bias wheels 57 and 58 in a downward direction to compress the soil around seeds 34 as indicated by the arrows 73 in FIG. 2. Spring assembly 66 permits the wheels 57 and 58 to ride over objects, such as rocks.

Referring to 7 and 9, there shown a modification of the packer wheel assembly of the invention generally at 100 adjustably mounted on a shank 21 of a earth working tool assembly. Packer wheel assembly 100 has a generally U-shaped body 101 mounted on shank 21. Body 101 has a base 102 and rearwardly directed side members 103 and 104. A pair of U-bolts 106 and 108 accommodating nuts 107 and 109 mount body 101 on shank 21. U-bolts 106 and 108 and nuts 107 and 109 thereon permit the packer wheel assembly to be mounted in a selected location on shank 21 to control the planting depth of seeds 34 in the soil.

Figure 9:
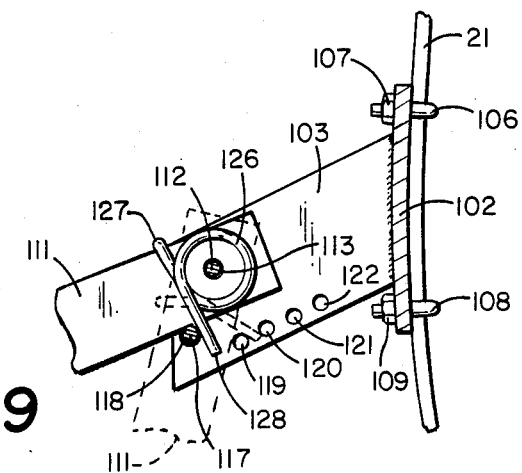
FIG. 9 is a sectional view taken along line 9—9 of FIG. 8.
Figure 8:
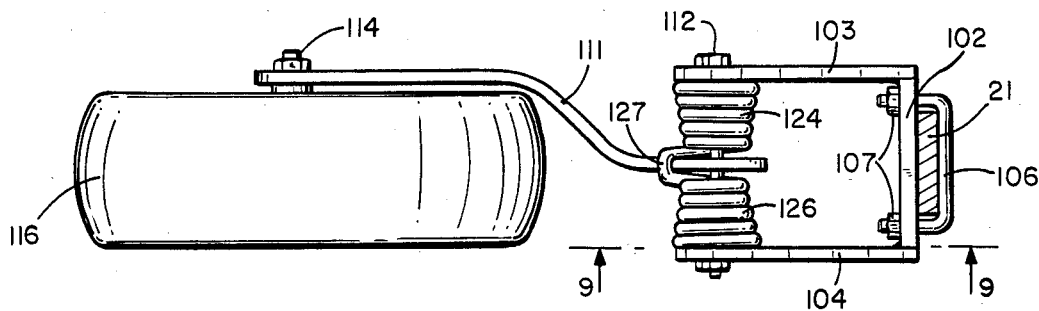
FIG. 8 is a top view of FIG. 7.

A rearwardly directed arm or strut 111 is pivotally mounted on side members 103 and 104 with transverse bolt 112. As shown in FIG. 9, arm 111 has a hole 113 accommodating bolt 112. An axle 114 is attached to the rear or lower end of arm 111. A single wheel 116 is rotatably mounted on axle 114. As shown in FIG. 8, arm 111 is off set to locate wheel 116 in longitudinal alignment with shank 21.

Figure 7:
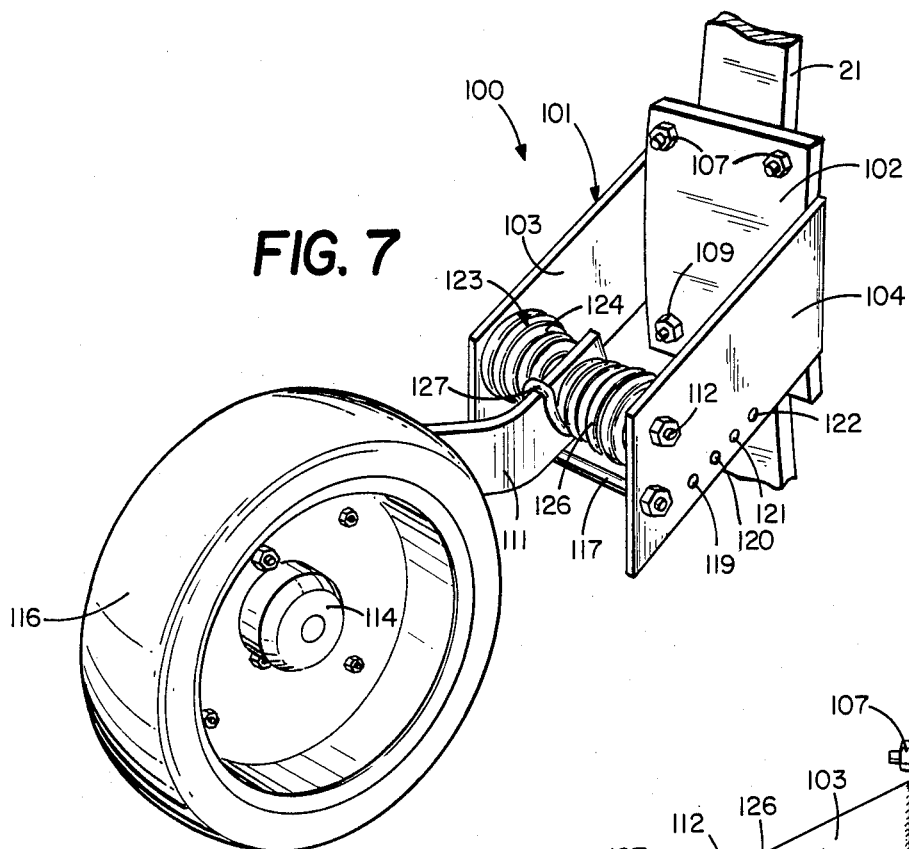
FIG. 7 is a perspective view of a modification of the press wheel assembly of the invention.

As shown in FIGS. 7 and 9, a stop pin or bolt 117 is mounted on side members 103 and 104 below arm 111. Side members 103 and 104 have a plurality of holes 118-122 adapted to locate stop bolt 117 in the selected position relative to side members 103 and 104. Holes 118-122 allow for further adjustment of the depth of the earth working shovel 23 and the compression or compacting force of wheel 116 on soil.

A spring assembly comprising a double coil torsion spring 123 is positioned about bolt 112 between side members 103 and 104. Spring 123 has a first coil spring 124 and a second coil spring 126. An inverted U-shaped portion 127 connects adjacent ends of coil springs 124 and 126. Arm 111 located between coil springs 124 and 126 is engaged by the inverted U-shaped portion 127. Coil springs 124 and 126 each have downwardly directed ends 128 that engage stop bolt 117 as shown in FIG. 9. Ends 128 hold coil springs 124 and 126 in torsion whereby arm 111 is continuously biased a downward direction in engagement with stop bolt 117. The spring assembly permits wheel 116 to ride over objects, such as rocks.

In use, field cultivator 10 is pulled by tractor 11 to work soil and provide a transport vehicle for air seed planter 26. Air seed planter 26 is operable to distribute the seeds via hoses 27-30 to earth working tool assemblies 17-20. The seeds 34 are dispensed into the ground behind each earth working shovel 23 of each of the earth working tool assemblies 17-20. The packer wheel assemblies 36-39 function independently of each other to compress and compact the soil around seeds 34. The packer wheel assemblies also provide independent gauge wheels for each shank to control the planting depth of seeds 34 in the soil. This improves germination of the seeds. Each packer wheel assembly will track its associated earth working tool assembly and follow the contour of the soil. This is achieved on level soil as well as on hill side grades.

The planting depth of seeds 34 is controlled by the soil working position of shovel 23. This is attained by the adjustment of location of packer wheel assembly 36 on shank 21. Nuts 47 and 49 are adjustable to allow U-bolts 46 and 48 to locate the body 41 in a selected position on shank 21. Wheels 57 and 58 function as gauge wheels as well as press wheels to control the earth working depth of the shovel 21 and the compaction of soil around seeds 34. Spring assembly 66 continuously biases wheels 57 and 58 in a downward direction to provide generally uniform soil compaction about seeds 34. As shown in FIG. 3, wheels 57 and 58 compress soil adjacent the sides of the row of seeds 34. The wheel 116, as shown in FIG. 8, compresses the soil over the top of row of seeds 34.

While there has been shown and described preferred embodiments of the packer wheel assembly of the invention, it is understood that changes in the structure and shape of the packer wheel assembly and its use with other earth working implements may be made by those skilled in the art without departing from the invention. The invention is defined in the following claims.

The embodiments of the invention in which an exclusive property or privilege is claimed are defined as follows:

1. A packer wheel assembly useable with an earth working implement having a shank and a tool mounted thereon for working soil comprising: body means adapted to be mounted on the shank, said body means having laterally spaced side members, wheel means for compacting the soil and maintaining a selected earth working depth of said tool, arm means connecting the wheel means to the body means, means rotatably mounting the wheel means on the arm means, remote from the body means, pivot means extended between the side members and mounted thereon mounting the arm means on the side members for movement in generally up and down directions, said arm means extended between said side members, stop means extended between the side members and mounted thereon generally below the pivot means, said arm means being engageable with the stop means to limit downward movement of the arm means and maintain a selected earth working depth of said tool, and biasing means engageable with the arm means and stop means for biasing the arm means downward into engagement with the stop means and yieldably holding the wheel means in engagement with the soil.

2. The packer wheel assembly of claim 1 wherein: said body means comprises a U-shaped body.

3. The packer wheel assembly of claim 1 wherein: said side members have means to adjustably position the stop means on the side members whereby the earth working depth of the tool can be adjusted.

4. The packer wheel assembly of claim 1 wherein: said biasing means comprises spring means located between said side members and surrounding said pivot means.

5. The packer wheel assembly of claim 4 wherein: said spring means comprise a double torsion coil spring having a middle portion engageable with the arm means and end portions engageable with the stop means.

6. The packer wheel assembly of claim 1 including: means for adjustably mounting the body means on the shank.

7. The packer wheel assembly of claim 1 wherein: said wheel means comprises a pair of wheels located adjacent opposite side of the arm means.

8. The packer wheel assembly of claim 1 wherein: said wheel means comprises a single wheel adapted to be located in general alignment with said shank.

9. The packer wheel assembly of claim 1 wherein: said biasing means comprising a double torsion coil spring having laterally spaced spring bodies and a middle portion engageable with the arm means, said arm means being located between said coiled body portions, said spring having end portions engageable with the stop means whereby said spring continuously biases said arm means in a downward direction into engagement with the stop means and yieldably urges the wheel means into engagement with the soil.

10. The packer wheel assembly of claim 9 wherein: said side members including means to adjustably position the stop means on the side member to provide adjustment of the earth working depth of the tool.

11. An apparatus for planting seed into the soil comprising: a field cultivator having a plurality of earth working tool assemblies for working the soil, each earth working tool assembly having a shank and a tool mounted on the shank, planter means mounted on the cultivator operable to dispense seed into the soil behind at least one of said shanks, soil packer means for compacting the soil about said seed, means mounting the soil packer means on said one of said shanks, said soil packer means having a body, said body having laterally spaced side members extended rearwardly from said one of said shanks, wheel means for compacting the soil about the seed dispensed into the soil, arm means connecting the wheel means to the body, pivot means extended between said side members and mounted thereon, said arm means extended between said side members and mounted on said pivot means for movement in generally up and down directions, means rotatably mounting the wheel means on the arm means, remote from the pivot means, stop means extended between said side members and mounted thereon generally below said pivot means, said arm means being engageable with the stop means to limit downward movement of the arm means and to maintain a selected earth working depth of the tool and depth of the seed in the soil, and biasing means for biasing the arm means in a downward direction into engagement with stop means and yieldably holding the wheel means in engagement of soil thereby compacting the soil about the seed, said biasing means comprising spring means located between said side members, said spring means having a coil portion surrounding the pivot means, first portion engageable with the arm, and a second portion engageable with the stop means whereby the coil portion of the spring biases the arm means into engagement with the stop means.

12. The apparatus of claim 11 wherein: the planter means comprises an air seed planter, and hose means for carrying air and seed from the planter to said one of said shanks.

13. The apparatus of claim 11 wherein: said shank is a C-shaped spring member.

14. The apparatus of claim 1 wherein: said spring means comprises a double torsion coil spring having a middle portion engageable with the arm means and end portions engageable with the stop means.

15. The apparatus of claim 11 wherein: said wheel means comprises a pair of wheels located adjacent opposite sides of the arm means.

16. The apparatus of claim 11 wherein: said wheel means comprises a single wheel located in generally longitudinal alignment with said one of said shanks.

17. The apparatus of claim 11 including: means for adjustably mounting the stop means on the body to provide adjustment of the earth working depth of the tool and depth of the seed in the soil.

18. The apparatus of claim 11 wherein: said side members having a plurality of longitudinally spaced holes for adjusting the position of the stop means relative to the side members to provide adjustment of the earth working depth of the tool and depth of the seed in the soil.

* * * * *

UNITED STATES PATENT AND TRADEMARK OFFICE
CERTIFICATE OF CORRECTION

PATENT NO. : 4,579,071
DATED : April 1, 1986
INVENTOR(S) : Douglas J. Johnson

It is certified that error appears in the above-identified patent and that said Letters Patent is hereby corrected as shown below:

Column 7, line 7, Claim 1 should be --Claim 11--.

Signed and Sealed this

Twenty-third Day of September 1986

[SEAL]

Attest:

DONALD J. QUIGG

Attesting Officer

Commissioner of Patents and Trademarks